United States Patent [19]

Theisen et al.

[11] 4,421,823
[45] Dec. 20, 1983

[54] FLEXIBLE WRAPPING MATERIAL AND METHOD OF MANUFACTURE

[75] Inventors: Henry J. Theisen, New London; Willard H. Gehrke, Appleton, both of Wis.

[73] Assignee: Curwood, Inc., New London, Wis.

[21] Appl. No.: 383,754

[22] Filed: Jun. 1, 1982

[51] Int. Cl.³ .................. B32B 27/06; B29C 19/00; B33B 27/08

[52] U.S. Cl. ...................... 428/349; 156/244.11; 426/127; 428/483; 428/516; 428/518; 428/520; 428/522

[58] Field of Search .............. 428/516, 518, 520, 522, 428/483, 349; 426/127; 156/244.11

[56] References Cited

U.S. PATENT DOCUMENTS

Re. 28,554   9/1975   Curler et al. .................. 428/518
3,386,648   6/1968   Powell .
3,442,687   5/1969   Hagan ............................ 428/516

Primary Examiner—George F. Lesmes
Assistant Examiner—E. Rollins Buffalow

Attorney, Agent, or Firm—McWilliams, Mann, Zummer and Sweeney

[57] ABSTRACT

A flexible wrapping material comprising a film laminate is provided for packaging of food products which is resistant to flex-cracking and pinhole development, is impervious to liquids and gasses, and exhibits the property of grease-resistance without the use of adhesives to promote bonds between the layers. The film laminate consists of an outer layer of heat-set, biaxially oriented polymeric material followed by a layer of polymeric material, a layer of oxygen barrier polymer, a layer of biaxially oriented polypropylene, a special grease-resistant polymer, and an inner layer of heat-sealable polymeric material. The film laminate is made by bonding the outer surface layer of heat-set, biaxially oriented polymer to a substrate in which an oxygen barrier material is carried on a biaxially oriented polypropylene/special grease-resistant polymer by means of an intermediate layer of polymeric material. A layer of heat-sealable polymeric material is then extrusion-coated on the special polymer surface to form the inner layer of the laminate.

12 Claims, 1 Drawing Figure

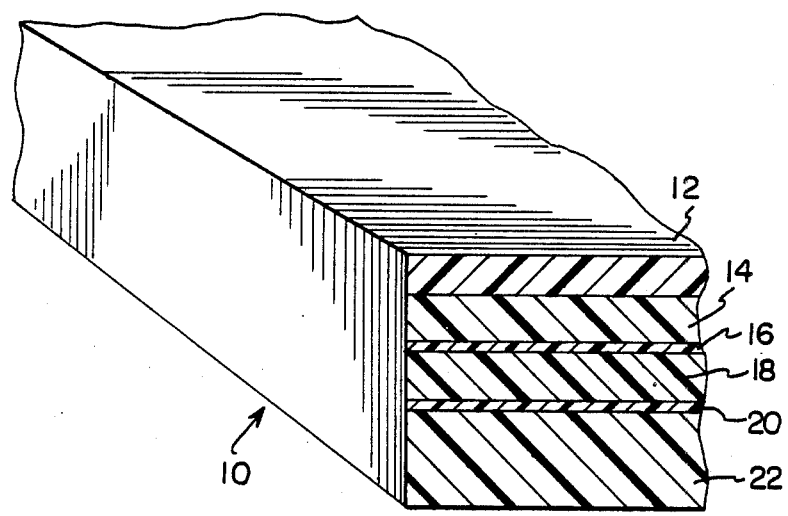

FLEXIBLE WRAPPING MATERIAL AND METHOD OF MANUFACTURE

BACKGROUND OF THE INVENTION

In the packaging of various food products, such as cheese and meat, in a flexible wrapper, difficulty has been experienced with the development of small pinholes in the wrapper at points of stress resulting from flexing of the wrapper during shipment and handling. The pinhole development resulted in a loss of the essential barrier characteristics of the wrapper and permitted loss or gain of moisture by the package and the access of oxygen into the package with resultant spoilage of the product intended to be protected by the wrapper.

A detailed discussion of the problems in this art and one film laminate which solved these problems is set forth in U.S. Pat. No. Re. 28,554, a reissue of U.S. Pat. No. 3,445,324. The teachings of that patent as to the state of the art are incorporated herein by reference. The wrapping material of the film laminate disclosed in U.S. Pat. No. Re. 28,554 consisted of a wrapping material prepared by bonding to one surface of a cellophane sheet coated on both sides with vinylidene chloride copolymer a biaxially oriented polypropylene sheet and to the other surface a thin layer of low density polyethylene or heat-sealable polymeric material having a melting point below that of the polypropylene. Bonding in that film laminate was accomplished by gluing or polyethylene lamination.

It was determined, however, that better results might be obtained if one were able to eliminate the adhesive layer which would also eliminate the use of any organic solvents that would be released into the atmosphere. The elimination of these solvents is a very important environmental consideration and reduces the threat of any residual organic material migrating into the food product being packaged. At the same time it was recognized that it was necessary to provide a film laminate which would maintain the integrity of the product and present a grease-resistant barrier to prevent the passing through of any food oils or grease which could destroy or greatly reduce the bond between the individual layers, thereby reducing the integrity of the package formed from upper and lower layers of the film laminate of the present invention.

U.S. Pat. No. Re. 28,554 discusses in detail the formation of packages of the type contemplated for use with the present film laminate. As indicated there, the wrapper or film laminate is contemplated for use on an automatic packaging machine which forms and closes the package by means of heat-sealing. The inner layer of heat-sealable polymeric material is placed in face-to-face relationship with the inner surface of a second laminate of identical construction which permits the formation of a heat-sealed closure which is gas-tight. With products such as cheese and meat it is found advantageous to displace the air from the void space inside the package by flushing with an inert gas or by evacuation before sealing the package. The retention of this gas or vacuum and the substantial exclusion of the atmospheric oxygen is important to the proper preservation of the product.

SUMMARY OF THE INVENTION

The present invention relates to a flexible wrapping material in laminate form and its method of manufacture. The laminate is particularly suited for packaging of food products such as cheese or meat. The laminate consists of an outer layer of heat-set, biaxially oriented polymeric material, such as polypropylene or polyester, bonded on its inner side to a layer of polymeric material, for example, polyethylene, which is sandwiched between the outer layer and a layer of oxygen barrier polymer, such as polyvinylidene chloride copolymer (Saran) or ethylenevinyl alcohol, a layer of biaxially oriented polypropylene, a layer of special grease-resistant polymer resistant to the migration of food oils or greases through the laminate selected from the group consisting of polyethylene, copolymers of vinyl acetate with a vinyl acetate content of approximately 12 percent or less, copoylmers of ethylene acrylic acid, an ethylene-vinyl acetate terpolymer, and ionomers, and an inner layer of heat-sealable polymeric material having a lower melting point than said outer layer, such as a vinyl acetate copolymer of polyethylene.

The laminate material is prepared in a two-part operation. An outer surface layer of biaxially oriented polymer is extrusion-laminated with an intermediate layer of polymeric material to a sustrate in which an oxygen barrier material is carried on a biaxially oriented polypropylene/special polymer. A layer of heat-sealable polymeric material is then extrusion-coated onto the special polymer surface of the material obtained in the first operation. In its preferred embodiment, the laminate produced does not require the use of adhesive and the solvents necessary with such use. This material offers a high degree of resistance to grease which can reduce the integrity of the packaging material by destroying or reducing the bond between individual laminate layers.

BRIEF DESCRIPTION OF THE DRAWING

The drawing shows an enlarged cross-sectional view showing a preferred form of the laminate of this invention.

DETAILED DESCRIPTION

Referring to the drawing, the numeral 10 indicates a film laminate made in accordance with the present invention. An outer layer 12 is supplied consisting of a balanced, heat-set, biaxially oriented polymeric material. Heat-set polypropylene or polyester have both been used and determined to be acceptable in forming the laminate of this invention. Heat-set is the property of dimensional stability or lack of shrink when exposed to sealing temperatures and is critical in the present environment. This layer, which becomes the outside of the package which is eventually formed, must be a tough, flexible film which can impart resistance to surface abrasions and prevent sticking of the film wrapper to the heat-seal bars on the packaging machine. This layer is generally a thin layer of from 0.4 to about 1.0 mils, preferably 0.4 to 0.75 mils. The degree of balance due to the biaxial orientation which is the resistance to unequal shrink or stretch in both the transverse and machine directions is not critical. Films of varying balance and heat-set function satisfactorily in the finished structure. Generally, biaxially oriented heat-set polypropylene or polyester is preferred.

Layer 14 consists of polymeric material which imparts a minimum degree of bonding between the biaxially oriented polymer 12 and the next layer 16. Layer 14 is generally a thin layer of from about 0.4 to 1.0 mils of polyethylene, preferably 0.5 to 0.75 mils, having a density from about 0.910 to 0.930 grams per cubic centimeter and with a minimum melt temperature of 285° C. The thickness of this layer can vary with economics and application.

Layer 16 consists of an oxygen barrier polymer which has a polar functional group or groups to facilitate intermolecular attractive bonding such as polyvinylidene chloride (Saran) or ethylene-vinyl alcohol. This layer provides a barrier against the migration of oxygen through the laminate and is essential to protect the food being packaged against spoilage. Layer 16 provides the essential barrier properties necessary for extended shelf life. Layer 16 has a thickness of approximately 0.1 mil, however, due to the difficulty in measuring this thickness, it is generally expressed in pounds per 3,000 square feet, namely, 2.5 to 5.0 pounds per 3,000 square feet, preferably 3.0 to 4.0 pounds per 3,000 square feet.

Layer 18 consists of biaxially oriented polypropylene. This layer is a substitute for the cellophane layer disclosed in U.S. Pat. No. Re. 28,554 and provides greater resistance to pinholing due to abrasion or flexing. This layer imparts improved pinholing resistance to the final structure and generally varies in thickness from 0.5 to 1.5 mils depending upon the economics and application, preferably 0.6 to 0.8 mils.

Layer 20 comprises what will be referred to as a special grease-resistant polymer. The purpose of this layer is to prevent the migration of food oils through the polymeric heat-sealable material which could lead to a reduction or even loss of bonding between the individual layers of the flexible wrapping material. The loss of bond between the layers can lead to a loss of essential barrier properties due to the migration of oxygen or water vapor between the individual layers. Consequently, transfer of oxygen through the more permeable polymeric heat-sealable material and contact with the food product can result in loss of shelf life and possible food spoilage. This also results in a loss of package integrity due to bond reduction or loss of bond and also a reduction in heat-seal strength of the package due to layer separation.

The special grease-resistant polymer is a thin self-supporting layer of film at room temperature, generally having a minimum thickness of 0.1 mils, but preferably being 0.2 mils. The preferred method does not include the application and drying of a coating containing organic solvents which are detrimental to the environment. This special polymer consists of either polyethylene, copolymers of vinyl acetate having a vinyl acetate content of less than about 12 percent, ethylene acrylic acid copolymers, ethylene-vinyl acetate terpolymers, or ionomers. These special polymers also exhibit high grease-resistance properties and bonding abilities in various blends with each other. It has been found that copolymers of vinyl acetate having a vinyl acetate content in excess of 15 percent do not exhibit sufficient grease-resistant properties to perform in the intended environment.

The inner layer 22 is a heat-sealable polymeric material which provides excellent heat-sealability at temperatures less than 300° F. While polyethylene is suitable for this purpose, other low temperature, heat-sealable polymeric materials, such as ethylene-vinyl acetate copolymer, are preferred and ethylene-vinyl acetate copolymer blended with microcrystalline wax and paraffin wax in suitable proportions, may be used. It is important that the polymeric layer 22 have a lower melting point than outer layer 12. It is generally expected that the polymeric material of layer 22 will seal at a temperature below 270° F. on the packaging machinery. Due to the dimensions of the product being packaged, it is very difficult to bring the end portions of the flexible wrapper together in such a means as to prevent any wrinkling or creases in the heat-sealed areas of the film. Because of this, the polymer material must flow at the sealing temperature to "fill in." Thus, in the heat-seal process, it must flow and fill channels to yield an airtight package. Layer 22 is generally from about 1.0 to about 3.0 mils thick and preferably from 1.5 mils to 2.5 mils.

It must be understood that certain variations in the physical properties of the materials of this film laminate can be made without departing from the scope of the present invention. Accordingly, Table 1 discloses the listed physical properties of each of the materials of the film laminate of the present invention.

TABLE I

| Material | Softening Point °C. | Operating Range °C. | Melt Index 8M/10 min. | Density gm/cm$^3$ |
|---|---|---|---|---|
| heat-set biaxially oriented polymer | | | | |
| polypropylene | 90–100 | N.A.* | N.A. | 0.905 |
| polyester | 250–260 | N.A. | N.A. | 1.38–1.41 |
| nylon | 215–225 | N.A. | N.A. | 1.1–1.3 |
| polymeric material | 90–100 | 300–350 | 2.0–10. | 0.910–.950 |
| oxygen barrier material | 140–160 | N.A. | N.A. | 1.21–1.71 |
| biaxially oriented polypropylene | 90–100 | N.A. | N.A. | 0.905 |
| special polymer | | | | |
| polyethylene | 90–100 | 150–360 | .5–3.5 | .91–.93 |
| vinyl acetate copolymers | 85–95 | 150–350 | .25–30 | .93–.95 |
| copolymers of ethylene acrylic acid | 80–90 | 140–340 | 5.5–11. | .925–.935 |
| ethylene vinyl acetate terpolymers | 35–82 | 200–325 | 3.5–35 | .93–1.0 |
| ionomers | 85–100 | 165–360 | .7–14 | .94–.95 |
| heat sealable polymeric material | 60–70 | 200–220 | 7–31 | .91–.95 |

*(NOTE - N.A. means not applicable)

The method of manufacture of the film laminate previously discussed is basically a two-part operation, each of the two steps being interchangeable. In the first operation of the preferred method, the heat-set, biaxially oriented polymer is extrusion-laminated to a biaxially oriented coextrusion of oxygen barrier coated polypropylene/special polymer. This requires corona treatment of the biaxially oriented polypropylene surface to a minimum treatment level of 35 dynes per square centimeter (ASTM Test Method D-2578) to facilitate good interfacial wetting of the oriented polypropylene surface to accept the emulsion-coating of the oxygen barrier material. This substrate, carrying an oxygen barrier material on biaxially oriented polypropylene/special polymer, is then extrusion-laminated to the corona treated surface of the outer layer of biaxially oriented polymer with a polymeric material in its molten state.

Other alternative methods are available to formulate the film laminate of the first step. One method consists of adhesive lamination of the outer layer of biaxially oriented polymer to the oxygen barrier material carried by the biaxially oriented polypropylene/special polymer. Another alternative is to apply the oxygen barrier material in an out-of-line operation which would require a third operation. The preferred embodiment, however, is to use a coextrusion of biaxially oriented polypropylene/special polymer. Other methods are available to combine the biaxially oriented polypropylene and special polymer including extrusion-coating the special polymer onto the biaxially oriented polypropylene with or without the use of adhesives or primers. Alternately, solvent or emulsion-coating of the special polymer can be made onto the biaxially oriented polypropylene surface.

The second operation requires the extrusion-coating of the heat-sealable polymeric material onto the special polymer surface of the material obtained in the first operation. This can also be accomplished by adhesive lamination of the heat-sealable polymeric material to the special polymer surface of the material produced in the first operation.

Certain preferred embodiments of this invention and methods of making the laminate are illustrated in the following specific examples:

No. 1. A 45-gauge film of Curwood's CURPHANE brand 4640, a heat-set, biaxially oriented polypropylene manufactured from Hercules Resin PD-064, was extrusion-laminated to the polypropylene side of CURPHANE brand SCC 701 film, a biaxially oriented polypropylene/1650 DuPont Surlyn coextruded film; with 7 pounds per 3,000 square feet of polyethylene U.S.I. Grade 201 resin having a density of 0.916 and a melt index of 5.0. The CURPHANE SCC 701 film was corona treated and coated on the polypropylene side with 3.5 pounds (dry solids per 3,000 square feet) of Morton Surfene 2010, polyvinylidene chloride emulsion just prior to the extrusion-lamination. This lamination was then extrusion-coated on the Surlyn side of the CURPHANE SCC 701 with 28 pounds per 3,000 square feet of U.S.I. Grade 652-53, an 18 percent ethylene-vinyl acetate copolymer.

No. 2. A 50-gauge film of a heat-set, biaxially oriented polyester, manufactured from Eastman Plastic's resin 9663, was extrusion-laminated to the polypropylene side of CURPHANE brand SSC 701, a biaxially oriented polypropylene/1650 DuPont Surlyn coextruded film; with 7 pounds per 3,000 square feet of polyethylene, U.S.I. Grade 201 resin having a density of 0.916 and a melt index of 5.0. The CURPHANE brand SSC 701 film was corona treated and coated on the polypropylene side with 3.5 pounds (dry solids per 3,000 square feet) of Morton Surfene 2010, polyvinylidene chloride emulsion just prior to the extrusion-lamination. This lamination was then extrusion-coated on the Surlyn side of the CURPHANE brand SCC 701 with 28 pounds per 3,000 square feet of U.S.I. Grade 652-53 an 18 percent ethylene-vinyl acetate copolymer.

No. 3. A 45-gauge film of Curwood's CURPHANE brand 4640, a heat-set, biaxially oriented polypropylene manufactured from Hercules Resin PD-064, was extrusion-laminated to the polypropylene side of Norprop 380CG, a biaxially oriented polypropylene/ethylene-vinyl acetate coextruded film, with 7 pounds per 3,000 square feet of polyethylene, U.S.I. Grade 201 resin having a density of 0.916 and a melt index of 5.0. The Norprop 380CG film was corona treated and coated on the polypropylene side with 3.5 pounds (dry solids per 3,000 square feet) of Morton Surfene 2010, polyvinylidene chloride emulsion just prior to the extrusion-lamination. This lamination was then extrusion-coated on the vinyl acetate side of the Norprop 380CG with 28 pounds per 3,000 square feet of U.S.I. Grade 652-53, and 18 percent ethylene-vinyl acetate copolymer.

Tests have been conducted along the lines set forth in Columns 6 and 7 of U.S. Pat. No. Re. 28,554 to determine the relative effectiveness of packages made in accordance with the flexible film laminate of the present invention. These tests have indicated a surprising superiority of this new wrapping material over the wrapping material of U.S. Pat. No. Re. 28,554 and other flexible film laminates tested.

Thus, it has been shown, somewhat surprisingly, that the cellophane layer, Saran coated on both sides, of the film laminate disclosed in U.S. Pat. No. Re. 28,554 can be eliminated and be replaced by a biaxially oriented polypropylene coated on its upper side with Saran and bonded on its lower side to a special grease-resistant polymer and that the film laminate can be constructed without the use of adhesives or organic solvents that would be released into the atmosphere.

The resultant film laminate is superior in its resistance to pinhole development due to abrasion or flexing. The laminate is also superior in terms of its oxygen barrier properties and internal bond strength resulting in a package of greater integrity preventing food spoilage and resulting in extended shelf life.

Various features of the invention have been particularly shown and described in connection with the illustrated embodiments of the invention. However, it must be understood that these particular arrangements merely illustrate and that the invention is to be given its fullest interpretation within the terms of the appended claims.

What is claimed is:

1. A film laminate of flexible, heat-sealable wrapping material, particularly suitable for use in the packaging of products which are to be maintained in hermetically sealed relationship to the atmosphere, comprising a first outer layer of heat-set, biaxially oriented polymeric material bonded on its inner side to a layer of polymeric material which is sandwiched between said outer layer and a layer of oxygen barrier polymer, adapted to provide a barrier against the migration of oxygen through the laminate, a layer of biaxially oriented polypropylene disposed between said layer of oxygen barrier polymer and a layer of special grease-resistant polymer bonding, without the use of a solvent, said layer of biaxially oriented polypropylene to an inner layer of heat-sealable polymeric material having a lower melting point than said outer layer whereby said layer of special grease-resistant polymer is resistant to food oils and greases and is selected from the group consisting of polyethylene, copolymers of vinyl acetate having a vinyl acetate content of approximately 12 percent or less, copolymers of ethylene acrylic acid, ethylene-vinyl acetate terpolymers, and ionomers.

2. A film laminate in accordance with claim 1 wherein said outer layer is heat-set, biaxially oriented polypropylene.

3. A film laminate in accordance with claim 1 wherein said outer layer is heat-set, biaxially oriented polyester.

4. A film laminate in accordance with claim 1 wherein said layer of polymeric material sandwiches between said outer layer and said oxygen barrier layer is polyethylene.

5. A flim laminate in accordance with claim 1 wherein said oxygen barrier layer is polyvinylidene chloride.

6. A film laminate in accordance with claim 1 wherein said oxygen barrier layer is ethylene-vinyl alcohol.

7. A film laminate in accordance with claim 1 wherein said layer of special grease-resistant polymer is polyethylene.

8. A film laminate in accordance with claim 1 wherein said layer of special grease-resistant polymer is a copolymer of vinyl acetate having a vinyl acetate content of approximately 12 percent or less.

9. A film laminate in accordance with claim 1 wherein said layer of special grease-resistant polymer is a copolymer of ethylene acrylic acid.

10. A film laminate in accordance with claim 1 wherein said layer of special grease-resistant polymer is an ethylene-vinyl acetate terpolymer.

11. A film laminate in accordance with claim 1 wherein said layer of special grease-resistant polymer is an ionomer.

12. A method of making a film laminate of flexible, heat-sealable wrapping material, suitable for use in the packaging of products which are to be maintained in hermetically sealed relationship to the atmosphere, the steps of the method comprising forming a substrate of oxygen barrier material/biaxially oriented polypropylene/special grease-resistant polymer by emulsion-coating of the oxygen barrier material onto a coextrusion of biaxially oriented polypropylene and special grease-resistant polymer, extrusion laminating an outer layer of heat-set, biaxially oriented polymeric material onto said oxygen barrier surface of said substrate with a layer of polymeric material in its molten state and extrusion coating, as an inner layer, a heat-sealable polymeric material onto said special grease resistant polymeric surface of said substrate.

* * * * *